(12) United States Patent
Xu et al.

(10) Patent No.: US 9,237,498 B2
(45) Date of Patent: Jan. 12, 2016

(54) METHOD, USER EQUIPMENT AND SYSTEM FOR REALIZING SERVICE CONTINUITY OF MULTIMEDIA BROADCAST AND MULTICAST SERVICE

(75) Inventors: Hui Xu, Shenzhen (CN); Zijiang Ma, Shenzhen (CN); Dapeng Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 187 days.

(21) Appl. No.: 13/988,283

(22) PCT Filed: Jun. 30, 2011

(86) PCT No.: PCT/CN2011/076698
§ 371 (c)(1),
(2), (4) Date: May 17, 2013

(87) PCT Pub. No.: WO2012/136023
PCT Pub. Date: Oct. 11, 2012

(65) Prior Publication Data
US 2013/0229974 A1    Sep. 5, 2013

(30) Foreign Application Priority Data
Apr. 8, 2011    (CN) .......................... 2011 1 0088573

(51) Int. Cl.
*H04W 36/08*    (2009.01)
*H04W 4/06*    (2009.01)
(Continued)

(52) U.S. Cl.
CPC .............. *H04W 36/08* (2013.01); *H04L 12/189* (2013.01); *H04W 4/06* (2013.01); *H04W 48/20* (2013.01)

(58) Field of Classification Search
CPC .... H04L 12/189; H04W 36/08; H04W 48/00; H04W 4/06
USPC .................................................... 370/310, 312
See application file for complete search history.

(56) References Cited

U.S. PATENT DOCUMENTS 8,712,414 B2 * 4/2014 Somasundaram et al. ..... 455/436
2005/0090278 A1 * 4/2005 Jeong et al. ................... 455/525
(Continued)

FOREIGN PATENT DOCUMENTS

CN    1836387 A    9/2006
CN    101656914 A    2/2010
(Continued)

OTHER PUBLICATIONS

P.R. China, State Intellectual Property Office, International Search Report for International Application No. PCT/CN2011/076698, mailed Jan. 19, 2012.

*Primary Examiner* — Chi H Pham
*Assistant Examiner* — Robert Lopata
(74) *Attorney, Agent, or Firm* — Bright IP Law Offices

(57) ABSTRACT

The disclosure discloses a method, User Equipment (UE) and a system for realizing service continuity of a Multimedia Broadcast and Multicast Service (MBMS). The method comprises that: when a UE that is receiving or is interested in receiving the MBMS service moves, if the UE is in an idle mode, the UE selects a target cell with a same frequency as the MBMS service to perform a cell reselection or the UE uses a frequency of the MBMS as a highest-priority frequency to perform a cell reselection; if the UE is in a connected mode, a network side selects a target cell with a same frequency as the MBMS service to perform a handover according to an MBMS receiving state reported by the UE. With the disclosure, the MBMS service experience of users can be improved.

18 Claims, 5 Drawing Sheets

(51) Int. Cl.
*H04L 12/18* (2006.01)
*H04W 48/20* (2009.01)

(56) References Cited

U.S. PATENT DOCUMENTS

| | | | |
|---|---|---|---|
| 2005/0118992 A1* | 6/2005 | Jeong et al. | 455/422.1 |
| 2005/0245260 A1* | 11/2005 | Nielsen et al. | 455/435.1 |
| 2006/0039309 A1* | 2/2006 | Lee et al. | 370/312 |
| 2006/0072516 A1* | 4/2006 | Jeong et al. | 370/335 |
| 2006/0111106 A1* | 5/2006 | Moon et al. | 455/435.2 |
| 2006/0203756 A1* | 9/2006 | Hu | 370/312 |
| 2007/0183358 A1* | 8/2007 | Cai | 370/328 |
| 2008/0020762 A1* | 1/2008 | Fischer | 455/435.1 |
| 2008/0207201 A1* | 8/2008 | Fischer | 455/434 |
| 2008/0261581 A1* | 10/2008 | Cai | 455/422.1 |
| 2008/0267109 A1* | 10/2008 | Wang et al. | 370/312 |
| 2009/0047953 A1* | 2/2009 | Proctor | 455/435.2 |
| 2010/0284319 A1* | 11/2010 | Wang et al. | 370/312 |
| 2011/0053490 A1* | 3/2011 | Wu | 455/3.01 |
| 2011/0305184 A1* | 12/2011 | Hsu | 370/312 |
| 2012/0002584 A1* | 1/2012 | Shimizu | 370/312 |
| 2013/0107790 A1* | 5/2013 | Lee et al. | 370/312 |
| 2013/0107864 A1* | 5/2013 | Lee et al. | 370/331 |
| 2014/0112236 A1* | 4/2014 | Jung et al. | 370/312 |

FOREIGN PATENT DOCUMENTS

| | | |
|---|---|---|
| CN | 102202265 A | 9/2011 |
| WO | 2005109687 A1 | 11/2005 |

* cited by examiner

METHOD, USER EQUIPMENT AND SYSTEM FOR REALIZING SERVICE CONTINUITY OF MULTIMEDIA BROADCAST AND MULTICAST SERVICE

CROSS REFERENCE TO RELATED APPLICATIONS

This application is the U.S. National Stage of International Patent Application No. PCT/CN2011/076698 filed on Jun. 30, 2011, which claims priority to Chinese Patent Application No. 201110088573.0 filed on Apr. 8, 2011. Both the PCT Application and Chinese Application are hereby incorporated by reference in their entirety.

FIELD OF THE INVENTION

The disclosure relates to a Multimedia Broadcast and Multicast Service (MBMS), and in particular to a method, User Equipment (UE) and a system for realizing service continuity of the MBMS.

BACKGROUND OF THE INVENTION

With the development of Internet and the popularity of big-screen multi-function UEs, a lot of mobile data multimedia services and various high-bandwidth multimedia services have emerged, such as video conference, television broadcast, video on demand, advertisement, online education, interactive game and the like; these services not only meet the requirement of a mobile user on multiple services, but also bring a new business growth to a mobile operator. These mobile data multimedia services require that multiple users can receive the same data simultaneously, and have advantages of large data amount, long duration; delay sensitivity and the like compared with a general data service.

In order to utilize a mobile network resource effectively, the $3^{rd}$ Generation Partnership Project (3GPP) proposes an MBMS service which is a technology for transmitting data from one data source to a plurality of target UEs; and this technology realizes sharing of network resources (including a core network and an access network) and improves the utilization rate of the network resource (particularly an air interface resource). The MBMS service defined by the 3GPP not only can realize multicast and broadcast of messages of low-rate plain texts, but also can realize multicast and broadcast of high-rate multimedia services and provide a variety of videos, audios and multimedia services. The MBMS service undoubtedly follows the trend of the future development of mobile data and provides a better business prospect for the development of 3G.

In a Long Term Evolution (LTE) system, a UE may have two operating modes: a Radio Resource Control (RRC) Idle mode or an RRC Connected mode. A mobility of a UE in the idle mode is implemented by a cell selection or cell reselection, and the process of the cell selection or cell reselection is initiated by the UE: the cell reselection first considers a priority of a frequency, wherein the priority of the frequency is provided by a system message; the UE preferentially selects a frequency with a top priority to perform a cell reselection; and the mobility of a UE in the connected mode is implemented by a handover, wherein the handover process is initiated by an evolved NodeB (eNB) in which a source cell is located.

The characteristics of the MBMS service lie in large data amount, long duration of a UE receiving a service and constant average data rate. These characteristics determine that configurations of scheduling and control signaling of these MBMS services are semi-static, that is, scheduling information and control signaling information of the MBMS service keep unchanged for a long time, wherein the information mentioned here is periodically sent by an MBMS Control Channel (MCCH) and thus is called MCCH information. An evolved MBMS (eMBMS) system might have a plurality of MCCHs, wherein each MCCH corresponds to a different Multicast Broadcast Single Frequency Network (MBSFN) and only bears the control signaling information of the MBMS service sent by a corresponding MBSFN. The configuration information of the MCCH is indicated through a System Information Block (SIB) 13 and the scheduling of the SIB13 is indicated through an SIB1.

The MBMS technology is introduced in a Release 9 (R9) of the LTE system and is enhanced in a Release 10 (R10). In the R9, control signaling and user data of the MBMS service are separately transmitted and are respectively called a Control Plane (CP) and a User Plane (UP). The CP controls the sending of the UP data by controlling start, update and end of a service, so as to implement the sending of the basic MBMS service. In the R100, in order to improve the resource utilization rate of an MBMS system and to facilitate the management of an operator, the MBMS technology is enhanced, mainly including: a counting mechanism and a priority based preemption mechanism.

An LTE Advanced (LTE-A) system introduces a Carrier Aggregation (CA) technology, that is, multiple carriers with different frequencies (bands) which can be continuous or discrete are stored at one location and a network side sends data to a UE using two or more carriers simultaneously. A UE in the connected mode with the CA capability can receive data on two or more carriers simultaneously. Each UE at least supports the aggregation of two Component Carriers (CCs); the network side allocates and indicates to a UE a Primary Cell (Pcell) of the UE and a Secondary Cell (Scell) of the UE. A UE in an idle state hosts in its own Pcell. A UE only receives broadcast system information and a paging message in the Pcell, and does not retrieve a public retrieval region of a Physical Downlink Control Channel (PDCCH) in the Scell.

The MBMS system defines an MBMS service area, an MBSFN area and a reserved cell of the MBSFN area, wherein the MBMS service area refers to an area sending specific MBMS session data: the MBSFN area refers to an area formed by a plurality of cells which collaborate to finish a MBSFN transmission; a reserved cell of the MBSFN area refers to a cell sending other services with a limited power on a corresponding MBSFN sub-frame resource and not participating in the MBSFN transmission in the MBSFN area. In this application, all cells other than the reserved cell in the MBSFN area are called non-reserved cells. The MBMS service area is dynamically configured by a Broadcast-Multicast Service Center (BM-SC) according to a service requirement; the MBSFN area is statically or semi-statically configured by a Multi-cell/multicast Coordination Entity (MCE); and the reserved cell is configured by the MCE. Generally, the MBMS area is greater than the MBSFN area, as shown in FIG. 1.

The MBMS service is provided by the BM-SC. The BM-SC sends MBMS session data to a network element in the MBMS service area, wherein the network element includes an MBMS Gateway (MBMS-GW) and a Packet Data Network Gateway (PDN-GW). The MBMS-GW sends the MBMS session data to an eNB joining a multicast group in a multicast manner, and the eNB located in the same MBSFN area sends the MBMS session data to a UE in the MBSFN area in an MBSFN manner, which is called a Point To Multipoint (PTM) transmission or MBSFN transmission. After the PDN-GW receives the MBMS session data, if a Unicast service bearer is established, the PDN-GW sends the MBMS session data to a Serving Gateway (S-GW) and the S-GW sends the MBMS session data to an eNB which then sends the MBMS session data to a corresponding UE, which is called a Point To Point (PTP) transmission. The transmission process above indicates that: in the MBMS service area, the UE can receive the MBMS service through a PTP or PTM mode. For the PTP mode, generally the UE initiates a Packet-switched Stream (PSS) client request to a PSS server.

Before the MBMS service session starts, the BM-SC first performs a service announcement; the purpose of the announcement is to send a brief introduction of the MBMS service to the UE, wherein the announcement can be sent by the following ways: an MBMS bearer; or, an interaction mode, for example, Hyper Text Transport Protocol (HTTP); or, a PTP push mode, for example, Short Message Service (SMS), Multimedia Message Service (MMS), HTTP push and the like.

During the study and practice process of the present technology, it is found that the present technology has problems as follows: when a UE that is receiving the MBMS service is moving, only the service continuity of a Unicast service is considered during the decision of a cell reselection by the UE or a handover by a network side; if a plurality of CCs is deployed in the network, the UE probably performs a cell reselection or cell handover to a target cell of which the CC is different from that of the MBMS service, thus the MBMS service is interrupted and the MBMS service experience of users is reduced; in the MBMS service area, when the UE that receives the MBMS service through the PTM mode moves to a non-MBSFN area or a reserved cell in the MBSFN area, the MBMS service is interrupted, thus the MBMS service experience of users is reduced; in the MBMS service area, when the UE that receives the MBMS service through the PTP mode moves to a non-reserved cell in the MBSFN area, the MBMS service is sent through the PTP mode and the PTM mode simultaneously, thus waste of resources is caused.

SUMMARY OF THE INVENTION

In view of the problem above, the main purpose of the disclosure is to provide a method, a UE and a system for realizing service continuity of an MBMS, through which the MBMS service experience of users can be improved.

In order to achieve the purpose above, the technical solution of the disclosure is realized as follows.

The disclosure provides a method for realizing service continuity of an MBMS, which comprises: when a UE that is receiving or is interested in receiving the MBMS service moves, if the UE is in an idle mode, the UE selecting a target cell with a same frequency as the MBMS service to perform a cell reselection or the UE using a frequency of the MBMS as a highest-priority frequency to perform a cell reselection; if the UE is in a connected mode, a network side selecting a target cell with a same frequency as the MBMS service to perform a handover according to an MBMS receiving state reported by the UE.

Further, after selecting the target cell to perform a cell reselection or handover, the method further comprises: the UE determining whether the target cell can provide the MBMS service according to an attribute of the target cell, if so, the UE receiving the MBMS service in the target cell through a Point To Multipoint (PTM) mode; otherwise, the UE requesting an establishment of a Point To Point (PTP) connection and receiving the MBMS service in the target cell through a PTP mode.

Further, the method specifically comprises:
when the UE that receives the MBMS service on a source cell through the PTM mode moves to a target cell that cannot provide the MBMS service, the UE requesting an establishment of a PTP connection and continuing receiving the MBMS service through the PTP mode.

Further, the method specifically comprises:
when the UE determines that:
the target cell is a reserved cell in an MBSFN area, or,
the target cell is a non-reserved cell without the MBMS service in the MBSFN area and that the MBSFN area to which the target cell belongs is different from an MBSFN area to which the source cell belongs, or,
the target cell belongs to a non-MBSFN area and that the target cell and the source cell belong to the same MBMS service area,
the UE requesting an establishment of a PTP connection and continuing receiving the MBMS service through the PTP mode.

Further, the UE determines whether the target cell is a reserved cell in the MBSFN area according to an indication in an SIB13 of the target cell.

Further, the UE determines:
whether the target cell and the source cell belong to the same MBSFN area according to an MBSFN area identifier in the SIB13 of the target cell and an MBSFN area identifier in an SIB13 of the source cell, and
whether the target cell has the MBMS service according to an MBMS identifier in an MCCH message in the target cell.

Further, the UE determines:
whether the target cell belongs to a non-MBSFN area according to whether the target cell has an SIB13, and
whether the target cell and the source cell belong to the same MBMS service area according to whether the UE itself receives an announcement of the MBMS service in the target cell.

Further, the method specifically comprises:
when the UE that receives the MBMS service in the source cell through the PTM mode moves to a target cell that can provide the MBMS service, the UE continuing receiving the MBMS service through the PTM mode.

Further, the method specifically comprises:
when the UE determines that the target cell is a non-reserved cell with the MBMS service in the MBSFN area, the UE continuing receiving the MBMS service according to MBMS service configuration information in the target cell through the PTM mode.

Further, the method specifically comprises:
when the UE that receives the MBMS service in the source cell through the PTM mode moves to a target cell, wherein the target cell is a non-reserved cell with the MBMS service in the MBSFN area, and when the MBSFN area to which the target cell belongs is different from the MBSFN area to which the source cell belongs, the UE continuing receiving the MBMS service according to MBMS service configuration information in the target cell through the PTM mode.

Further, the method specifically comprises: when the UE that receives the MBMS service in the source cell through the PTP mode moves to a non-reserved cell without the MBMS service in the MBSFN area, or,
when the UE that receives the MBMS service in the source cell through the PTP mode moves to a reserved cell in the MBSFN area, the UE requesting an establishment of a PTP connection and continuing receiving the MBMS service through the PTP mode.

Further, the method specifically comprises: when the UE that receives the MBMS service in the source cell through the PTP mode moves to a cell in a non-MBSFN area, the UE requesting an establishment of a PTP connection; if the request succeeds, the UE continuing receiving the MBMS service through the PTP mode; otherwise, interrupting the MBMS service.

Further, the method comprises: when the UE that receives the MBMS service in the source cell through the PTM mode moves to a target cell that belongs to a different MBMS service area than the MBMS service area of the source cell, interrupting the MBMS service.

Further, the method comprises: when the MBMS service is interrupted, a cause of the interruption of the MBMS service being provided to a Non-Access Stratum (NAS) or an application layer through an Access Stratum (AS).

The disclosure provides a UE for realizing service continuity of an MBMS, which is configured to:

select a target cell with a same frequency as the MBMS service to perform a cell reselection or use a frequency of the MBMS as a highest-priority frequency to perform a cell reselection, when the UE that is receiving or is interested in receiving the MBMS service moves and when the UE is in an idle mode;

or, configured to: report an MBMS receiving state of the UE to a network side so that the network side selects a target cell with a same frequency as the MBMS service to perform a handover according to the MBMS receiving state reported by the UE, when the UE that is receiving or is interested in receiving the MBMS service moves and when the UE is in a connected mode.

Further, the UE is configured to:

determine whether the target cell can provide the MBMS service according to an attribute of the target cell, after selecting the target cell to perform a cell reselection or handover; if so, receive the MBMS service in the target cell through a PTM mode; otherwise, request an establishment of a PTP connection and receive the MBMS service in the target cell through a PTP mode.

The UE is further configured to:

after the UE that receives the MBMS service on a source cell through the PTM mode moves to a target cell and when the UE determines that:

the target cell is a reserved cell in an MBSFN area, or, the target cell is a non-reserved cell without the MBMS service in the MBSFN area and that the MBSFN area to which the target cell belongs is different from an MBSFN area to which the source cell belongs, or, the target cell belongs to a non-MBSFN area and that the target cell and the source cell belong to the same MBMS service area, request an establishment of a PTP connection and receive the MBMS service through the PTP mode.

The UE is further configured to: continue receiving the MBMS service according to MBMS service configuration information in a target cell through the PTM mode, after the UE that receives the MBMS service in the source cell through the PTP mode moves to the target cell and when determining that the target cell is a non-reserved cell with the MBMS service in the MBSFN area.

The disclosure provides a system for realizing service continuity of an MBMS, which comprises: a UE that is receiving or is interested in receiving the MBMS service and a network side, wherein the UE is configured to: select a target cell with a same frequency as the MBMS service to perform a cell reselection or use a frequency of the MBMS as a highest-priority frequency to perform a cell reselection, when the UE moves and when the UE is in an idle mode; or report an MBMS receiving state of the UE, when the UE moves and when the UE is in a connected mode;

the network side is configured to: select a target cell with a same frequency as the MBMS service to perform a handover according to the MBMS receiving state reported by the UE.

It can be seen from the technical solution above that, when the UE that is receiving or is interested in receiving the MBMS service moves, the UE preferentially selects a target cell with a same frequency as the MBMS service to perform a cell reselection or the UE takes the frequency of the MBMS as a highest-priority frequency to perform a cell reselection, or the network side preferentially selects a target cell with a same frequency as the MBMS service to perform a handover, so as to realize the service continuity of the MBMS service and improve the MBMS service experience of users. Further, after selecting the target cell to perform a cell reselection or handover, if the target cell can provide the MBMS service, the UE that receives the MBMS service continues receiving the MBMS service in the target cell through the PTM mode; if the target cell cannot provide the MBMS service, the UE requests an establishment of a PTP connection and continues receiving the MBMS service in the target cell through the PTP mode; therefore, the disclosure can avoid an interruption of the MBMS service due to the movement of the UE and realize the service continuity of the MBMS service, thereby improving the MBMS service experience of users; moreover, the disclosure can avoid a repeat transmission of the MBMS service by the network side, thereby improving the utilization rate of radio resources.

DETAILED DESCRIPTION OF THE EMBODIMENTS

The disclosure is mainly directed to the following application scenarios: when a UE that is receiving or is interested in receiving an MBMS service moves, the UE performs a cell reselection or a network side hands over the UE to a target cell, wherein the target cell is located in an MBSFN area or a non-MBSFN area; when the target cell is located in the MBSFN area, the target cell can be a reserved cell or a non-reserved cell.

Figure 2:
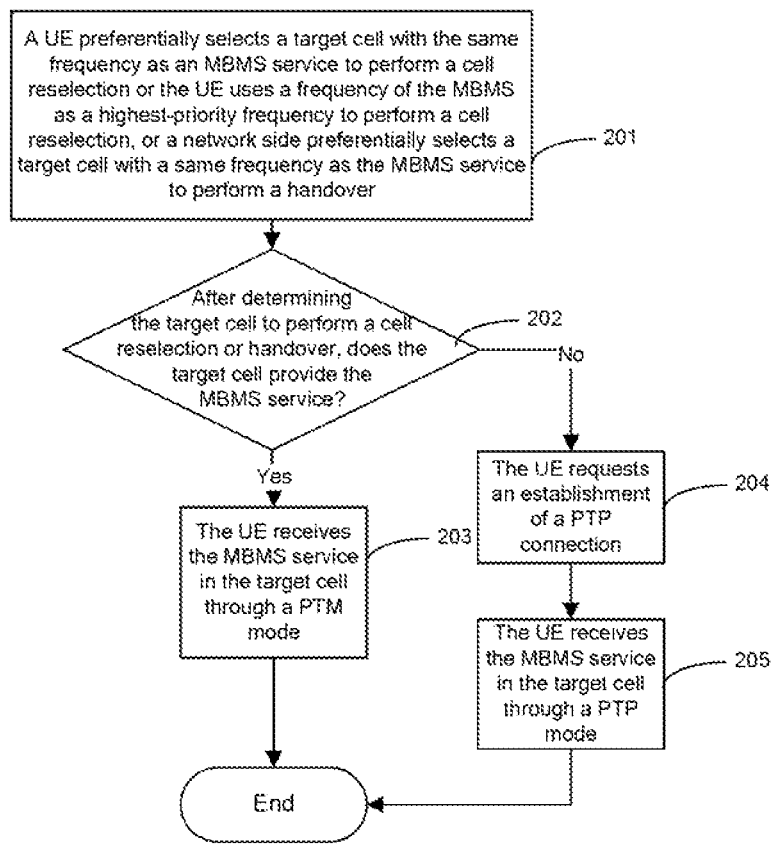
FIG. 2 shows a flowchart of a method for realizing service continuity of an MBMS service in the disclosure.

As shown in FIG. 2, a method for realizing service continuity of an MBMS service in the disclosure comprises:

Step 201: when a UE that is receiving or is interested in receiving the MBMS service moves, the UE preferentially selects a target cell with a same frequency as the MBMS service to perform a cell reselection or the UE uses a frequency of the MBMS as a highest-priority frequency to perform a cell reselection, or a network side preferentially selects a target cell with a same frequency as the MBMS service to perform a handover according to an MBMS receiving state reported by the UE;

wherein the UE that is receiving the MBMS service refers to a UE that is receiving the MBMS service through a PTM mode; the UE which is interested in receiving the MBMS service refers to a UE which receives the MBMS service through a PTP mode or does not receive the MBMS service and expects to receive the MBMS service through the PTM mode.

Preferably, the method also comprises Step 202 to Step 205 to further realize the service continuity of the MBMS service.

Step 202 to Step 205: after selecting the target cell to perform a cell reselection or handover, the UE determines whether the target cell can provide the MBMS service according to an attribute of the target cell, if so, the UE receives the MBMS service in the target cell through a PTM mode; otherwise, the UE requests an establishment of a PTP connection and receives the MBMS service in the target cell through a PTP mode.

"Selecting the target cell to perform a cell reselection or handover" includes an implication that the UE moves to the target cell;

wherein the attribute of the target cell refers to: whether the target cell has an SIB13, an indication in the SIB13 of the target cell whether the target cell is a reserved cell in an MBSFN area, an MBSFN area identifier in the SIB13 of the target cell, an MBMS service identifier in an MCCH message in the target cell, and the like contents; these contents are described in detail below.

The technical solution of the disclosure is described in further detail below through a plurality of specific embodiments.

Embodiment 1

The scenario of an Embodiment 1 is that: a UE moves in an MBMS service area; a plurality of CCs are deployed in a network; the UE has a CA capability, that is, the UE can receive more than one CC simultaneously in a connected mode; the MBMS service is deployed on one of the CCs; the UE is going to perform a cell reselection or a network side is going to perform a handover for the UE.

A method for realizing service continuity of an MBMS service in the Embodiment 1 comprises:

assuming that the MBMS service is deployed on a CC1, a UE receives the MBMS service in the source cell's CC1, a carrier frequency of a candidate target cell includes CC1, CC2 and CC3; a network side knows an MBMS receiving state of the UE, that is, the network side knows that the UE is receiving the MBMS service on the CC1, the UE can actively report the MBMS receiving state of itself or the network side requests the UE to report the MBMS receiving state of the UE itself.

For a UE that is in an idle mode, a cell reselection is needed; the UE preferentially selects a carrier frequency in which the MBMS service is located as a target cell for the cell reselection, or the UE uses a frequency of the MBMS service as a highest-priority frequency for the cell reselection; therefore, the UE selects the CC1 as a target cell; the UE reselects to the target cell to continue receiving the MBMS service or monitor an MCCH notification message; the MBMS frequency above refers to a frequency deployed by the MBMS service, also can be called an MBMS carrier or an MBMS frequency layer.

It should be noted that, during the cell reselection process, the UE autonomously takes the MBMS frequency as the highest priority, that is, the UE does not consider an MBMS frequency priority set by the network side, and the UE needs to perform the cell reselection on the basis of a Unicast cell reselection criteria.

For a UE that is in a connected mode, a handover is needed; the network side preferentially selects a target cell of a carrier frequency in which the MBMS service is located to perform the handover, that is, the network side selects the CC1 as a target cell; the UE enters the target cell to continue receiving the MBMS service on the CC1 or monitor an MCCH notification message.

It should be noted that: the UE above can be a UE that is interested in receiving the MBMS service, that is, the UE does not receive the MBMS service or receives the MBMS service through a PTP mode, prepares to receive the MBMS service through an MBSFN and monitors the MCCH notification message. For the UE which is interested in receiving the MBMS service, in preparation for a cell reselection or a handover, the UE or the network side preferentially selects a cell with the same frequency as the MBMS service as a target cell.

For a UE which does not receive an MBMS service, if a cell with the same frequency as an MBMS service expected to be received is selected as a target cell at the start of the cell reselection by the UE or the cell handover by the network side, the MBMS service experience of users can be improved.

Embodiment 2

Figure 1:
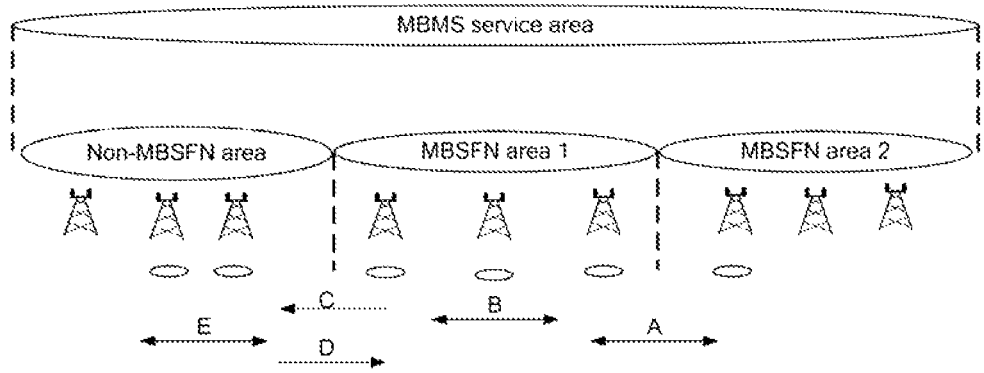
FIG. 1 shows a diagram of an application scenario of an embodiment in the disclosure.

The scenario for an Embodiment 2 is that: in an MBMS service area, a UE which receives the MBMS service through a PTM mode moves from one MBSFN area to another MBSFN area, referring to a scenario A shown in FIG. 1; or, a UE which receives the MBMS service through a PTM mode moves within the same MBSFN area, referring to a scenario B shown in FIG. 1.

Figure 3:
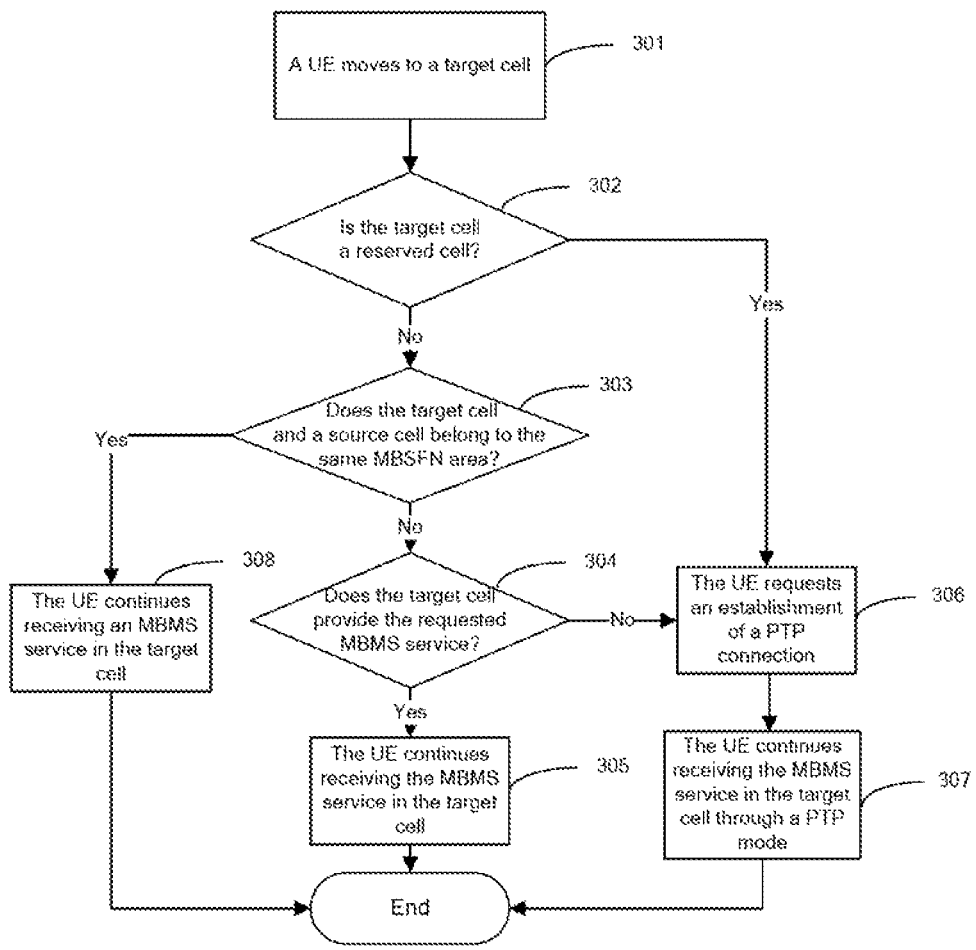
FIG. 3 shows a flowchart of a method for realizing service continuity of an MBMS service in an Embodiment 2 of the disclosure.

As shown in FIG. 3, a method for realizing service continuity of an MBMS service in the Embodiment 2 of the disclosure comprises:

Step 301: a UE moves from a source cell in an MBSFN area 1 to a target cell.

The UE can determine whether the target cell is a cell in a certain MBSFN area through a system message, wherein the specific way is: the UE reads an SIB1 of the target cell, if the SIB1 has related scheduling information of an SIB13, it is indicated that the target cell is a cell in a certain MBSFN area.

Step 302: the UE determines whether the target cell is a reserved cell; if so, execute Step 306; otherwise, execute Step 303.

The reserved cell refers to a cell sending other services with a limited power on a corresponding MBSFN sub-frame resource and not participating in an MBSFN transmission in the MBSFN area; the reserved cell generally is located at an edge of the MBSFN area, with a purpose of preventing a mutual interference between other MBSFN areas and a Unicast service; and the reserved cell is configured by a Mobility Control Function (MCF) at a network side.

The reserved cell receives CP information of the MBMS service, and needs to send Broadcast Control Channel (BCCH) information related to an MCCH, that is, SIB13; therefore, an indication of the reserved cell can be carried in the SIB13; the UE can determine whether a target cell is a reserved cell according to the indication in the SIB13 of the target cell; specifically, a bit R can be adopted to indicate, for example, R=1 indicates that the cell is a reserved cell; R=0 indicates that the cell is non-reserved cell.

Although the reserved cell does not participate in the MBSFN transmission, the reserved cell can send the MBMS service adopting a PTP mode.

Step 303: the UE determines whether the target cell and the source cell belong to the same MBSFN area; if so, execute Step 308; otherwise, execute Step 304.

The UE reads an MBSFN Area ID in the SIB13 of the target cell, and determines whether it is the same as the MBSFN Area ID in the SIB13 of the source cell; if so, it is indicated that the target cell and the source cell belong to the same MBSFN area; otherwise, it is indicated that the target cell and the source cell belong to different MBSFN areas.

If the target cell and the source cell belong to the same MBSFN area, the condition corresponds to the scenario B shown in FIG. 1; if the target cell and the source cell belong to different MBSFN areas, the condition corresponds to the scenario A shown in FIG. 1.

Step 304: the UE determines whether the target cell provides the MBMS service needed by the UE; if so, execute Step 305; otherwise, execute Step 306.

The UE reads an MCCH message in the target cell, and determines whether the target cell provides the MBMS service needed by the UE according to an MBMS service identifier in the MCCH message; if the MBMS service identifier in the MCCH message in the target cell is the same as the identifier of the MBMS service being received by the UE, it is indicated the target cell provides the MBMS service needed by the UE.

The MBMS service identifier is a Temporary Mobile Group Identity (TMGI).

Step 305: the UE continues receiving the MBMS service in the target cell through a PTM mode according to MBMS service configuration information in the target cell. Current process is ended.

If the target cell and the source cell belong to different MBSFN areas, the configuration information for the same MBMS service in different cells is different; therefore, after entering the target cell, the UE needs to read the MBMS service configuration information in the target cell again and receives the MBMS service according to the configuration information.

The MBMS service configuration information at least includes: SIB13, MCCH message, MCG Scheduling Information (MSI), and the like information.

Step 306: the UE requests an establishment of a PTP connection to receive the needed MBMS service through a PTP mode.

The request refers to a request initiated by the UE in the target cell after the UE enters the target cell; the request can be an AS message or a NAS message; the AS message refers to a request message sent by the UE to an eNB in which the target cell is located; the NAS message refers to a request message sent by the UE to a Mobility Management Entity (MME) to which the target cell belongs.

The request can be initiated by the UE through a PSS client.

The request includes at least one of the following: MBMS service ID, MBMS session start time, PDN-GW to which the UE belongs.

After the request arrives at a network side, the network side establishes a PTP bearer for the UE.

The UE is a UE which is in an idle mode or a connected mode; for the UE in the idle mode, an RRC connection is needed to be established with the network side.

Step 307: the UE continues receiving the needed MBMS service through the PTP mode in the target cell. Current process is ended.

Step 308: the UE continues receiving the needed MBMS service through the PTM mode in the target cell. Current process is ended.

Since the source cell and the target cell belong to the same MBSFN area, the UE can continue receiving the MBMS service in the target cell.

Through the process above, the UE can continue receiving the MBMS service, thereby realizing the service continuity of a suspended MBMS service.

Embodiment 3

The scenario of an Embodiment 3 is that: in an MBMS service area, a UE which receive the MBMS service through a PTM mode moves from an MBSFN area to a non-MBSFN area, referring to a scenario C shown in FIG. 1.

Figure 4:
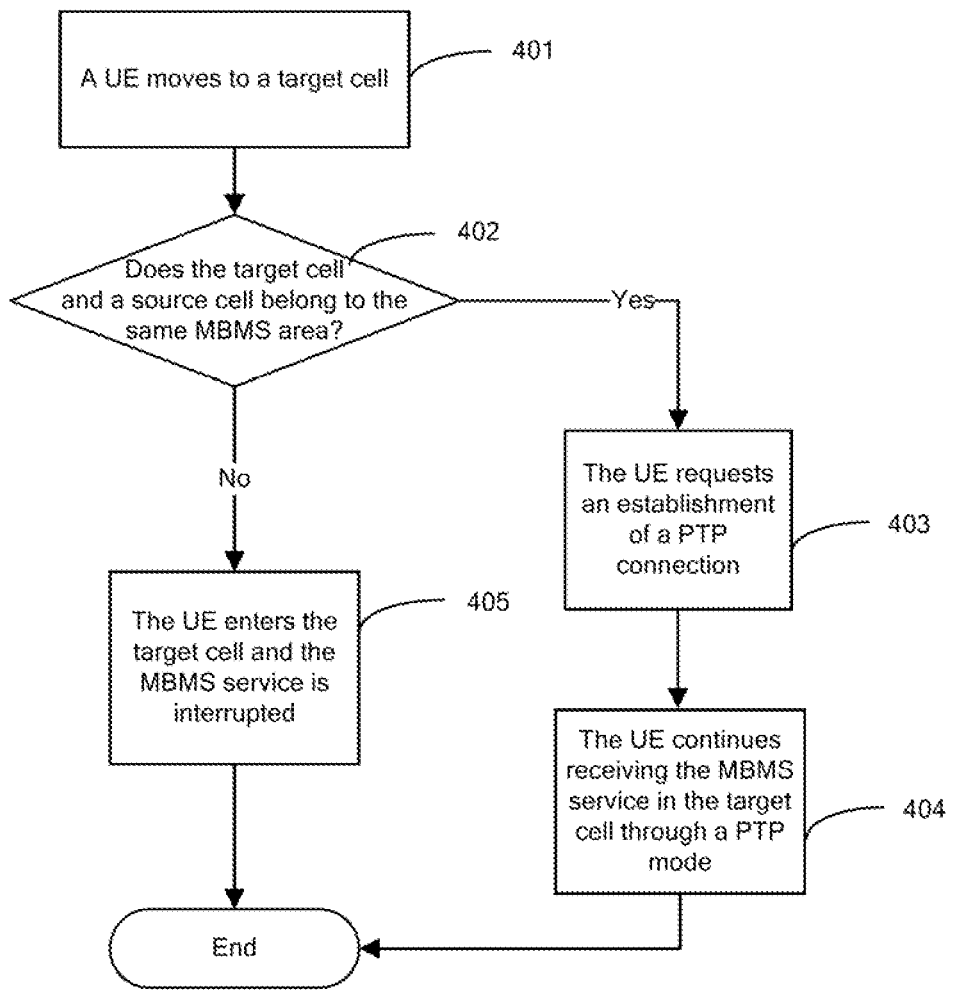
FIG. 4 shows a flowchart of a method for realizing service continuity of an MBMS service in an Embodiment 3 of the disclosure.

As shown in FIG. 4, a method for realizing service continuity of an MBMS service in the Embodiment 3 of the disclosure comprises:

Step 401: a UE moves to a target cell, wherein the target cell belongs to a non-MBSFN area.

The non-MBSFN area refers to an area in which no cell sends a system message SIB13; if the UE does not find the SIB13 of the target cell, it is indicated that the target cell is a cell in the non-MBSFN area.

Step 402: the UE determines whether the target cell and a source cell belong to the same MBMS area; if so, execute Step 403; otherwise, execute Step 405.

Before the MBMS service starts, a BM-SC sends an announcement in the MBMS service area for briefly introducing a content of the MBMS service, a start time of the MBMS service and the like information.

The UE can determine whether the target cell and the source cell belong to the same MBMS service area according to the announcement; for example, if the UE can receive the announcement of the needed MBMS service in the target cell, it is indicated that the target cell and the source cell belong to the same MBMS service area.

An eNB knows the MBMS service area to which the eNB belongs; and the eNB of the source cell exchanges MBMS service area information with the eNB of the target cell through an X2 interface; according to the exchanged MBMS service area information, the eNB of the source cell can hand over the UE to a target cell in which an eNB of the same MBMS service area is located.

Step 403: the UE requests an establishment of a PTP connection to receive the needed MBMS service through a PTP mode; that is, the UE sends a request message to a network side and requests the network side to send the needed MBMS service through the PTP mode.

Step 403 is the same as Step 306, and no further description is needed here.

Step 404: the UE continues receiving the needed MBMS service through the PTP mode in the target cell. Current process is ended.

Step 405: the UE enters the target cell and the MBMS service is interrupted.

When the MBMS service is interrupted, a message can be sent to a NAS or an application layer through an AS to indicate a cause of the interruption of the MBMS service: the UE leaves the MBMS service area; in this way, the MBMS service experience of users can be improved.

Embodiment 4

The scenario of an Embodiment 4 is that: in an MBMS service area, a UE which receives the MBMS service through a PTP mode moves from a non-MBSFN area to an MBSFN area, referring to a scenario D shown in FIG. 1.

Figure 5:
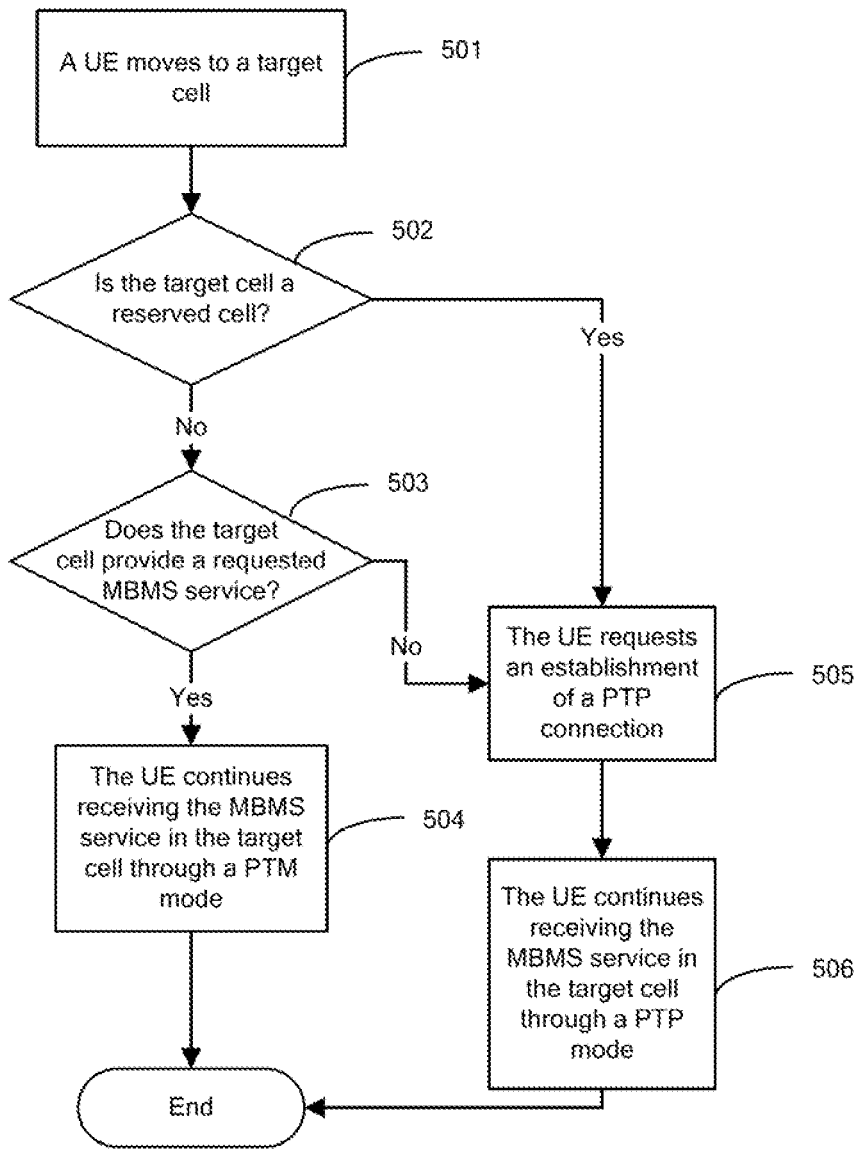
FIG. 5 shows a flowchart of a method for realizing service continuity of an MBMS service in an Embodiment 4 of the disclosure.

As shown in FIG. 5, a method for realizing service continuity of an MBMS service in the Embodiment 4 of the disclosure comprises:

Step 501: a UE moves from a source cell in a non-MBSFN area to a target cell in an MBSFN area.

The UE can determine whether the target cell is a cell in a certain MBSFN area through a system message, wherein the specific way is: the UE reads an SIB1 of the target cell, if the SIB1 has related scheduling information of an SIB13, it is indicated that the target cell is a cell in a certain MBSFN area.

Step 502: the UE determines whether the target cell is a reserved cell; if so, execute Step 505; otherwise, execute Step 503.

Step 502 is the same as Step 302, and no further description is needed here.

Step 503: the UE determines whether the target cell provides the MBMS service needed by the UE; if so, execute Step 504; otherwise, execute Step 505.

Step 503 is the same as Step 304, and no further description is needed here.

Step 504: the UE continues receiving the MBMS service in the target cell through a PTM mode according to MBMS service configuration information in the target cell. Current process is ended.

Step 504 further includes that: the UE releases a PTP connection with the source cell.

The UE which receives the MBMS service in the target cell can be in an idle mode or a connected mode.

The MBMS service configuration information at least includes: SIB13, MCCH message, MSI, and the like information.

Step 505: the UE requests an establishment of a PTP connection to receive the needed MBMS service through a PTP mode.

The establishment of a PTP connection refers to: releasing the PTP connection with the source cell and re-establishing a PTP connection in the target cell.

The process of establishing a PTP connection in the target cell is as described in Step 306, and no further description is needed here.

Step 506: the UE continues receiving the needed MBMS service in the target cell through the PTP mode. Current process is ended.

The UE receives the MBMS service through a re-established PTP connection in the target cell.

Embodiment 5

The scenario of an Embodiment 5 is that: in an MBMS service area, a UE which receives the MBMS service through a PTP mode moves from a cell in a non-MBSFN area to a cell in a non-MBSFN area, referring to a scenario E shown in FIG. 1.

Figure 6:
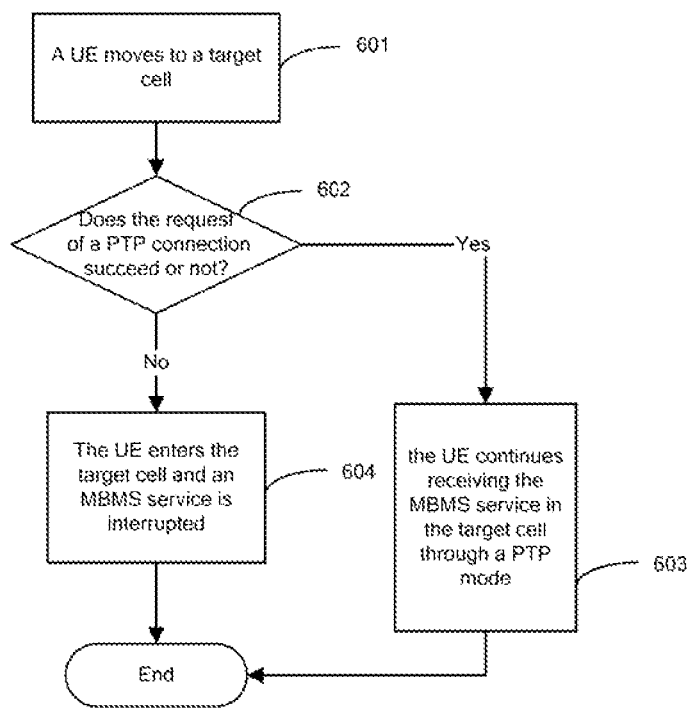
FIG. 6 shows a flowchart of a method for realizing service continuity of an MBMS service in an Embodiment 5 of the disclosure.

As shown in FIG. 6, a method for realizing service continuity of an MBMS service in the Embodiment 5 of the disclosure comprises:

Step 601: a UE moves to a target cell in a non-MBSFN area.

If the UE does not find an SIB13 of the target cell, it is indicated that the target cell is a cell in a non-MBSFN area.

Step 602: the UE requests an establishment of a PTP connection in the target cell to receive the needed MBMS service through a PTP mode; if the request succeeds, execute Step 603; otherwise, execute Step 604.

A failure of the request refers to: a failure of an RRC connection request due to a random access failure or other reasons.

For the condition of the random access failure, the UE might repeat initiating the request subsequently, thus Step 602 might be executed for several times.

Step 603: the UE continues receiving the needed MBMS service through the PTM mode in the target cell. Current process is ended Step 604: the UE enters the target cell and the MBMS service is interrupted.

When the MBMS service is interrupted, a message can be sent to a NAS or an application layer through an AS to indicate a cause of the interruption of the MBMS service: the UE leaves the MBMS service area: in this way, the MBMS service experience of users can be improved.

In order to implement the method above, the disclosure provides a UE for realizing service continuity of an MBMS service accordingly, wherein the UE is configured to: select a target cell with a same frequency as the MBMS service to perform a cell reselection or use a frequency of the MBMS as a highest-priority frequency to perform a cell reselection, when the UE that is receiving or is interested in receiving the MBMS service moves and when the UE is in an idle mode;

or, configured to: report an MBMS receiving state of the UE to a network side so that the network side selects a target cell with a same frequency as the MBMS service to perform a handover according to the MBMS receiving state reported by the UE, when the UE that is receiving or is interested in receiving the MBMS service moves and when the UE is in a connected mode.

The UE is further configured to:

determine whether the target cell can provide the MBMS service according to an attribute of the target cell, after selecting the target cell to perform a cell reselection or handover; if so, receive the MBMS service in the target cell through a PTM mode; otherwise, request an establishment of a PTP connection and receive the MBMS service in the target cell through a PTP mode.

The UE is further configured to:

after the UE that receives the MBMS service on a source cell through the PTM mode moves to the target cell, and when the UE determines that:

the target cell is a reserved cell in an MBSFN area, or,
 the target cell is a non-reserved cell without the MBMS service in the MBSFN area and that the MBSFN area to which the target cell belongs is different from an MBSFN area to which the source cell belongs, or,
 the target cell belongs to a non-MBSFN area and that the target cell and the source cell belong to the same MBMS service area,
 request an establishment of a PTP connection and receive the MBMS service on a target cell through the PTP mode.

The UE is further configured to: continue receiving the MBMS service according to MBMS service configuration information in a target cell through the PTM mode, after the UE that receives the MBMS service in the source cell through the PTP mode moves to the target cell and when determining that the target cell is a non-reserved cell with the MBMS service in the MBSFN area.

Figure 7:
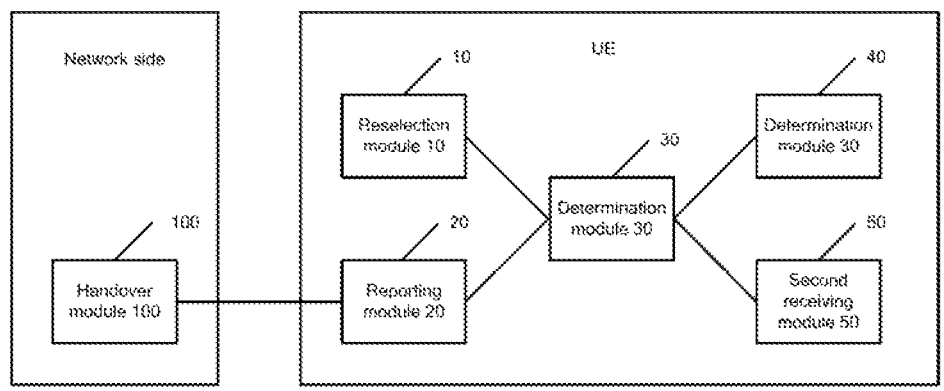
FIG. 7 shows a structure diagram of a system for realizing service continuity of an MBMS service in the disclosure.

For illustration, as shown in FIG. 7, the UE comprises:

a reselection module 10 configured to select a target cell with a same frequency as the MBMS service to perform a cell reselection or use a frequency of the MBMS as a highest-priority frequency to perform a cell reselection, when the UE that is receiving or is interested in receiving the MBMS service moves and when the UE is in an idle mode;

a reporting module 20 configured to report an MBMS receiving state of the UE to a network side, so that the network side selects a target cell with a same frequency as the MBMS service to perform a handover according to the MBMS receiving state reported by the UE, when the UE that is receiving or is interested in receiving the MBMS service moves and when the UE is in a connected mode.

The UE further comprises: a determination module 30 configured to determine whether the target cell can provide the MBMS service according to an attribute of the target cell; if so, to trigger a first receiving module 40; otherwise, to trigger a second receiving module 50.

The first receiving module 40 is configured to receive the MBMS service in the target cell through a PTM mode; and the second receiving module 50 is configured to request an establishment of a PTP connection and receive the MBMS service in the target cell through a PTP mode.

The determination module 30 is further configured to:

after the UE that receives the MBMS service on a source cell through the PTM mode moves to a target cell, and when the UE determines that:

the target cell is a reserved cell in an MBSFN area, or, the target cell is a non-reserved cell without the MBMS service in the MBSFN area and that the MBSFN area to which the target cell belongs is different from an MBSFN area to which the source cell belongs, or, the target cell belongs to a non-MBSFN area and that the target cell and the source cell belong to the same MBMS service area, trigger the second receiving module 50.

The determination module 30 is further configured to: trigger the first receiving module 40 to continue receiving the MBMS service according to MBMS service configuration information in a target cell through the PTM mode, after the UE that receives the MBMS service in the source cell through the PTP mode moves to the target cell and when determining that the target cell is a non-reserved cell with the MBMS service in the MBSFN area.

In order to implement the method above, the disclosure provides a system for realizing service continuity of an MBMS service, which comprises: a UE that is receiving or is interested in receiving the MBMS service and a network side, wherein the UE is configured to: select a target cell with a same frequency as the MBMS service to perform a cell reselection or use a frequency of the MBMS as a highest-priority frequency to perform a cell reselection, when the UE moves and when the UE is in an idle mode; or report an MBMS receiving state of the UE, when the UE moves and when the UE is in a connected mode;

the network side is configured to: select a target cell with a same frequency as the MBMS service to perform a handover according to the MBMS receiving state reported by the UE.

An exemplary structure of the UE is as shown in FIG. 7, wherein each function module has been described in the above context, and no further description is needed here. For illustration, the network side comprises: a handover module 100 configured to select a target cell with a same frequency as the MBMS service to perform a handover according to the MBMS receiving state reported by the reporting module 20.

Those skilled in the art should understand that, the UE and the system for realizing the service continuity of the MBMS in this disclosure are designed for implementing the forgoing method for realizing the service continuity of the MBMS; therefore, the implementation function of each module above can be understood by reference to the related description of the foregoing method, and no further description is needed here.

The above are only the preferred embodiments of the disclosure, and are not intended to limit the scope of protection of the disclosure.

What is claimed is:

1. A method for realizing service continuity of a Multimedia Broadcast and Multicast Service (MBMS), comprising:
when a UE that is receiving or is interested in receiving the MBMS service moves,
  if the UE is in RRC-Idle mode, the UE selecting a target cell with a same frequency as the MBMS service to perform a cell reselection or the UE using a frequency of the MBMS as a highest-priority frequency to perform a cell reselection; and
  if the UE is in RRC-Connected mode, a network side selecting a target cell with a same frequency as the MBMS service to perform a handover according to an MBMS receiving state reported by the UE, wherein
when the UE determines that:
  the target cell is a reserved cell in a Multicast Broadcast Single Frequency Network (MBSFN) area, or,
  the target cell is a non-reserved cell without the MBMS service in the MBSFN area and that the MBSFN area to which the target cell belongs is different from an MBSFN area to which the source cell belongs, or,
  the target cell belongs to a non-MBSFN area and that the target cell and the source cell belong to one MBMS service area,
the UE requesting an establishment of a PTP connection and continuing receiving the MBMS service through the PTP mode.

2. The method according to claim 1, wherein after selecting the target cell to perform a cell reselection or handover, the method further comprising:
  the UE determining whether the target cell can provide the MBMS service according to an attribute of the target cell;
  if so, the UE receiving the MBMS service in the target cell through a Point To Multipoint (PTM) mode; and
  otherwise, the UE requesting an establishment of a Point To Point (PTP) connection and receiving the MBMS service in the target cell through a PTP mode.

3. The method according to claim 2, further comprising: when the UE that receives the MBMS service on a source cell through the PTM mode moves to a target cell that cannot provide the MBMS service, the UE requesting an establishment of a PTP connection and continuing receiving the MBMS service through the PTP mode.

4. The method according to claim 1, wherein the UE determines whether the target cell is a reserved cell in the MBSFN area according to an indication in a System Information Block (SIB) 13 of the target cell.

5. The method according to claim 1, wherein the UE determines:
  whether the target cell and the source cell belong to the same MBSFN area according to an MBSFN area identifier in the SIB13 of the target cell and an MBSFN area identifier in an SIB13 of the source cell, and whether the target cell provides the MBMS service according to an MBMS identifier in an MBMS Control Channel (MCCH) message of the target cell.

6. The method according to claim 1, wherein the UE determines:
whether the target cell belongs to a non-MBSFN area according to whether the target cell has an SIB13, and
whether the target cell and the source cell belong to the same MBMS service area according to whether the UE itself receives an announcement of the MBMS service in the target cell.

7. The method according to claim 2, further comprising:
when the UE that receives the MBMS service in a source cell through the PTP mode moves to a target cell that can provide the MBMS service, the UE continuing receiving the MBMS service through the PTM mode according to MBMS service configuration information in the target cell.

8. The method according to claim 7, further comprising:
when the UE determines that the target cell is a non-reserved cell with the MBMS service in the MBSFN area, the UE continuing receiving the MBMS service according to MBMS service configuration information in the target cell through the PTM mode.

9. The method according to claim 2, further comprising:
when the UE that receives the MBMS service in a source cell through the PTM mode moves to a target cell, wherein the target cell is a non-reserved cell with the MBMS service in an MBSFN area different from an MBSFN area to which the source cell belongs, the UE continuing receiving the MBMS service according to MBMS service configuration information in the target cell through the PTM mode.

10. The method according to claim 2, further comprising:
when the UE that receives the MBMS service in a source cell through the PTP mode moves to a non-reserved cell without the MBMS service in an MBSFN area, or,
when the UE that receives the MBMS service in the source cell through the PTP mode moves to a reserved cell in an MBSFN area, the UE requesting an establishment of a PTP connection and continuing receiving the MBMS service through the PTP mode.

11. The method according to claim 2, further comprising:
when the UE that receives the MBMS service in a source cell through the PTP mode moves to a cell in a non-MBSFN area, the UE requesting an establishment of a PTP connection; if the request succeeds, the UE continuing receiving the MBMS service through the PTP mode; otherwise, interrupting the MBMS service.

12. The method according to claim 2, further comprising:
when the UE that receives the MBMS service in a source cell through the PTM mode moves to a target cell that belongs to a different MBMS service area than an MBMS service area of the source cell, interrupting the MBMS service.

13. The method according to claim 11, further comprising:
when the MBMS service is interrupted, a cause of the interruption of the MBMS service being provided to a Non-Access Stratum (NAS) or an application layer through an Access Stratum (AS).

14. A UE for realizing service continuity of an MBMS comprising:
a processor; and
memory;
wherein the UE is configured to: select a target cell with a same frequency as the MBMS service to perform a cell reselection or use a frequency of the MBMS as a highest-priority frequency to perform a cell reselection, when the UE that is receiving or is interested in receiving the MBMS service moves and when the UE is in RRC-Idle mode; or, the UE is configured to: report an MBMS receiving state of the UE to a network side so that the network side selects a target cell with a same frequency as the MBMS service to perform a handover according to the MBMS receiving state reported by the UE, when the UE that is receiving or is interested in receiving the MBMS service moves and when the UE is in RRC-Connected mode;
wherein, the UE is further configured to:
after the UE that receives the MBMS service on a source cell through the PTM mode moves to a target cell, and when the UE determines that:
the target cell is a reserved cell in an MBSFN area, or,
the target cell is a non-reserved cell without the MBMS service in the MBSFN area and that the MBSFN area to which the target cell belongs is different from an MBSFN area to which the source cell belongs, or,
the target cell belongs to a non-MBSFN area and that the target cell and the source cell belong to the same MBMS service area,
request an establishment of a PTP connection and receive the MBMS service through the PTP mode.

15. The UE according to claim 14, wherein the UE is further configured to:
determine whether the target cell can provide the MBMS service according to an attribute of the target cell, after selecting the target cell to perform a cell reselection or handover;
if so, receive the MBMS service in the target cell through a PTM mode; and
otherwise, request an establishment of a PTP connection and receive the MBMS service in the target cell through a PTP mode.

16. The UE according to claim 15, wherein the UE is further configured to: continue receiving the MBMS service according to MBMS service configuration information in a target cell through the PTM mode, after the UE that receives the MBMS service in the source cell through the PTM mode moves to the target cell and determines that the target cell is a non-reserved cell with the MBMS service in the MBSFN area.

17. A system for realizing service continuity of an MBMS, comprising:
a UE that is receiving or is interested in receiving an MBMS service; and
a network side,
wherein the UE is configured to: select a target cell with a same frequency as the MBMS service to perform a cell reselection or use a frequency of the MBMS as a highest-priority frequency to perform a cell reselection, when the UE moves and when the UE is in RRC-Idle mode; or report an MBMS receiving state of the UE, when the UE moves and when the UE is in RRC-Connected mode;
wherein
the UE is further configured to:
after the UE that receives the MBMS service on a source cell through the PTM mode moves to a target cell, and when the UE determines that:
the target cell is a reserved cell in an MBSFN area, or,
the target cell is a non-reserved cell without the MBMS service in the MBSFN area and that the MBSFN area to which the target cell belongs is different from an MBSFN area to which the source cell belongs, or, the target cell belongs to a non-MBSFN area and that the target cell and the source cell belong to the same MBMS service area, request an establishment of a PTP connection and receive the MBMS service through the PTP mode;

the network side is configured to: select a target cell with a same frequency as the MBMS service to perform a handover according to the MBMS receiving state reported by the UE.

18. The method according to claim 12, further comprising: when the MBMS service is interrupted, a cause of the interruption of the MBMS service being provided to a Non-Access Stratum (NAS) or an application layer through an Access Stratum (AS).

* * * * *